United States Patent
Morimoto et al.

(10) Patent No.: US 10,065,261 B2
(45) Date of Patent: Sep. 4, 2018

(54) POWER SUPPLY APPARATUS FOR WELDING MACHINE

(71) Applicant: SANSHA ELECTRIC MANUFACTURING CO., LTD., Osaka (JP)

(72) Inventors: Takeshi Morimoto, Osaka (JP); Hiroshi Sasou, Osaka (JP)

(73) Assignee: SANSHA ELECTRIC MANUFACTURING CO., LTD., Osaka (JP)

( * ) Notice: Subject to any disclaimer, the term of this patent is extended or adjusted under 35 U.S.C. 154(b) by 51 days.

(21) Appl. No.: 15/125,280

(22) PCT Filed: Feb. 25, 2015

(86) PCT No.: PCT/JP2015/055377
§ 371 (c)(1),
(2) Date: Sep. 12, 2016

(87) PCT Pub. No.: WO2015/137119
PCT Pub. Date: Sep. 17, 2015

(65) Prior Publication Data
US 2017/0095874 A1    Apr. 6, 2017

(30) Foreign Application Priority Data
Mar. 13, 2014   (JP) .................. 2014-049913

(51) Int. Cl.
*B23K 9/00* (2006.01)
*B23K 9/10* (2006.01)
*B23K 9/095* (2006.01)

(52) U.S. Cl.
CPC .......... *B23K 9/1062* (2013.01); *B23K 9/0953* (2013.01)

(58) Field of Classification Search
CPC .. B23K 9/1062; B23K 9/0953; B23K 10/006; H05B 1/28
(Continued)

(56) References Cited

U.S. PATENT DOCUMENTS 4,445,022 A    4/1984   Mori et al.
4,527,045 A *  7/1985   Nakajima ............ B23K 9/1062
                                              219/130.21
(Continued)

FOREIGN PATENT DOCUMENTS

JP    57-147709 A    9/1982
JP    2004-42112 A   2/2004
(Continued)

OTHER PUBLICATIONS

Office Action issued in connection with corresponding Japanese patent application No. JP 2014-049913, dated Nov. 9, 2017.
(Continued)

*Primary Examiner* — Mark Paschall
(74) *Attorney, Agent, or Firm* — Duane Morris LLP

(57) ABSTRACT

A welding machine power supply apparatus outputs welding current in accordance with welding conditions set through operation of a display and setting unit (20). When a welding operation is ended while the welding machine power supply apparatus is operating, the welding conditions effective at the time the welding operation is ended are automatically stored in a memory (16). When any ones or more of the welding conditions at the time when the welding operation is resumed by the use of the welding machine power supply apparatus are different from the one or ones which were effective when the welding operation was ended, a load button (70), a rotary encoder (64) and a set button (72) are operated to cause a control unit (14) to read out the welding conditions stored in the memory (16) which were effective when the welding operation was ended, and to set the read-out welding conditions in the welding machine power supply apparatus.

7 Claims, 4 Drawing Sheets

(58) Field of Classification Search
USPC .............. 219/130.1, 130.31, 130.32, 130.34, 219/137 PS, 137 R, 121.45, 121.54
See application file for complete search history.

(56) References Cited

U.S. PATENT DOCUMENTS

| | | | | |
|---|---|---|---|---|
| 6,075,225 | A * | 6/2000 | Heraly | B23K 9/1006 219/130.5 |
| 6,479,793 | B1 * | 11/2002 | Wittmann | B23K 9/0953 219/130.5 |
| 2009/0231423 | A1 * | 9/2009 | Becker | A61F 9/06 348/82 |
| 2011/0198329 | A1 * | 8/2011 | Davidson | B23K 9/095 219/130.5 |

FOREIGN PATENT DOCUMENTS

| | | |
|---|---|---|
| JP | 2006-82091 A | 3/2006 |
| JP | 2010-201499 A | 9/2010 |

OTHER PUBLICATIONS

Japanese Patent Office (ISA) of PCT, International Search Report dated Jun. 2, 2015 in connection with corresponding PCT Application No. PCT/JP2015/055377 filed on Feb. 25, 2015, pp. 1-2.

\* cited by examiner

POWER SUPPLY APPARATUS FOR WELDING MACHINE

TECHNICAL FIELD

This invention relates to a power supply apparatus for use with a welding machine and, more particularly, to such apparatus in which welding conditions can be set.

BACKGROUND ART

An example of a power supply apparatus for use with welding machines (hereinafter referred to as "welding machine power supply apparatus") is disclosed in Patent Literature 1. When a main power supply switch of this welding machine power supply apparatus is turned off, the current welding conditions are automatically stored in memory means. Upon turning on of the main power supply switch, the welding conditions stored in the memory means are read out and automatically set in the power supply apparatus.

PRIOR ART LITERATURE

Patent Literatures

Patent Literature 1: JP2006-82091A

DISCLOSURE OF THE INVENTION

Problems the Invention is to Solve

According to the technique disclosed in Patent Literature 1, when an operator of a welding machine who turned off the main power supply switch of the welding machine power supply apparatus to suspend the welding operation turns on again the main power supply switch to resume the welding operation, the welding conditions of the previous welding operation can be automatically set in the power supply apparatus. However, if the operator does not turn off the main power supply switch of the power supply apparatus, but, instead, turns off a torch switch provided on a torch connected to the power supply apparatus, or stops the welding operation by removing the torch away from a workpiece to thereby stop generation of an arc, the welding conditions cannot be stored. Further, it may happen that the operator leaves the working site, suspending the welding operation, and another operator alters the welding conditions in the power supply apparatus. Then, when the previous operator returns to the welding site and finds that the welding conditions have been altered and wants to set the previous welding conditions in the power supply apparatus, the welding conditions of the previous welding operation are no longer in the power supply apparatus, and, therefore, may try to re-set the conditions from memory. Sometimes, it may happen that the operator has not memorized all of the welding conditions. If such a situation arises, it will take a long time to re-set the welding conditions in the power supply apparatus, which impedes immediate resumption of the welding operation.

An object of the present invention is to provide a power supply apparatus for a welding machine in which current welding conditions can be easily returned to previous conditions and re-set even if the previous welding conditions have been altered after the welding operation performed under those welding conditions is temporarily suspended.

SUMMARY OF INVENTION

A power supply apparatus for a welding machine according to an embodiment of the present invention provides welding output in accordance with a set welding condition. The welding condition is set in the power supply apparatus through control means. Upon termination of given welding, the welding condition of that welding operation is stored in memory means. The memory means may preferably be non-volatile. If the current welding condition, e.g. the welding condition under which the welding operation is to be resumed while the welding machine power supply is in operation, is different from the previous welding condition of the previous welding operation, reading means reads out the previous welding condition stored in the memory means and sets it in the welding machine power supply apparatus.

With the welding machine power supply apparatus configured as stated above, at the time when one operator temporarily stops the welding operation, with the power supply apparatus being kept operating, the welding condition at that time is automatically stored in the memory means. Accordingly, even if some other operator changes the welding condition in the power supply apparatus after the one operator temporarily stops welding, the welding condition of the previous welding operation effective when it was temporarily stopped can be read out from the memory means by operating the reading means and set in the welding machine power supply apparatus. Because the previous welding condition can be re-set easily, the welding operation can be resumed without difficulty.

The termination of welding may be a stop of an welding output. It may be arranged that the welding condition be stored in the memory means upon turning off a main power supply switch of the welding machine power supply apparatus, but such arrangement cannot deal with a problem occurring when the welding operation is temporarily terminated without turning off the main power supply switch, such as when a torch switch only is turned off. In order for the then welding condition to be stored even in such situation, it is desirable to store it upon the stop of the welding output. The stop of the welding output may be a stop of the supply of output current to a welding load, for example. The stop of the supply of the output current may be detected by current detecting means, or may be detected by detecting the switching off of the torch switch, for example.

The memory means may have a plurality of memory regions for welding conditions. When welding operations are terminated, the memory means stores successively in the memory regions the welding conditions under which the respective welding operations are performed. When operated, the reading means reads out a desired one of the plurality of welding conditions stored in the memory regions and sets the read out welding condition in the welding machine power supply apparatus.

With this arrangement, it is possible to set the welding condition of the welding operation preceding the last welding operation. This arrangement is useful in case a welding operator changes the welding condition for extra temporary welding and, wants, after the termination of the temporary welding, to set again the welding condition of the previous welding operation, for example.

Also, it may be arranged that the storage of a welding condition in the memory means be done when the welding condition effective at the time of the termination of one welding operation differs from the welding condition effective at the time of the termination of the previous welding operation. With this arrangement, even when the memory means has only one memory region, it can be prevented for the same welding condition to be stored plural times in that one region, and, if the memory means has a plurality of memory regions, it can be prevented for the same welding condition to be stored in different plural regions.

DESCRIPTION OF EMBODIMENTS

A power supply apparatus for a welding machine according to a first embodiment of the present invention is a power supply apparatus for use with an arc welding machine, for example. The welding machine power supply apparatus can operate under various welding conditions. One of the welding conditions is a welding process. The welding process includes, for example, a stick welding process, a high-frequency TIG welding process, and a lift TIG welding process. This welding machine power supply apparatus can be used for selected one of the welding processes. Also, the power supply apparatus, when used in high-frequency TIG welding or lift TIG welding, the polarity of its output current can be switched between DC and AC. The DC/AC switching is also one of the welding conditions. Further, one of the welding conditions may be a welding sequence, for example, a crater mode. The crater mode includes different modes, such as 2T, 4T, repeat and spot modes. For various processes and crater modes, various parameters are set. The welding conditions include also these parameters.

Figure 1:
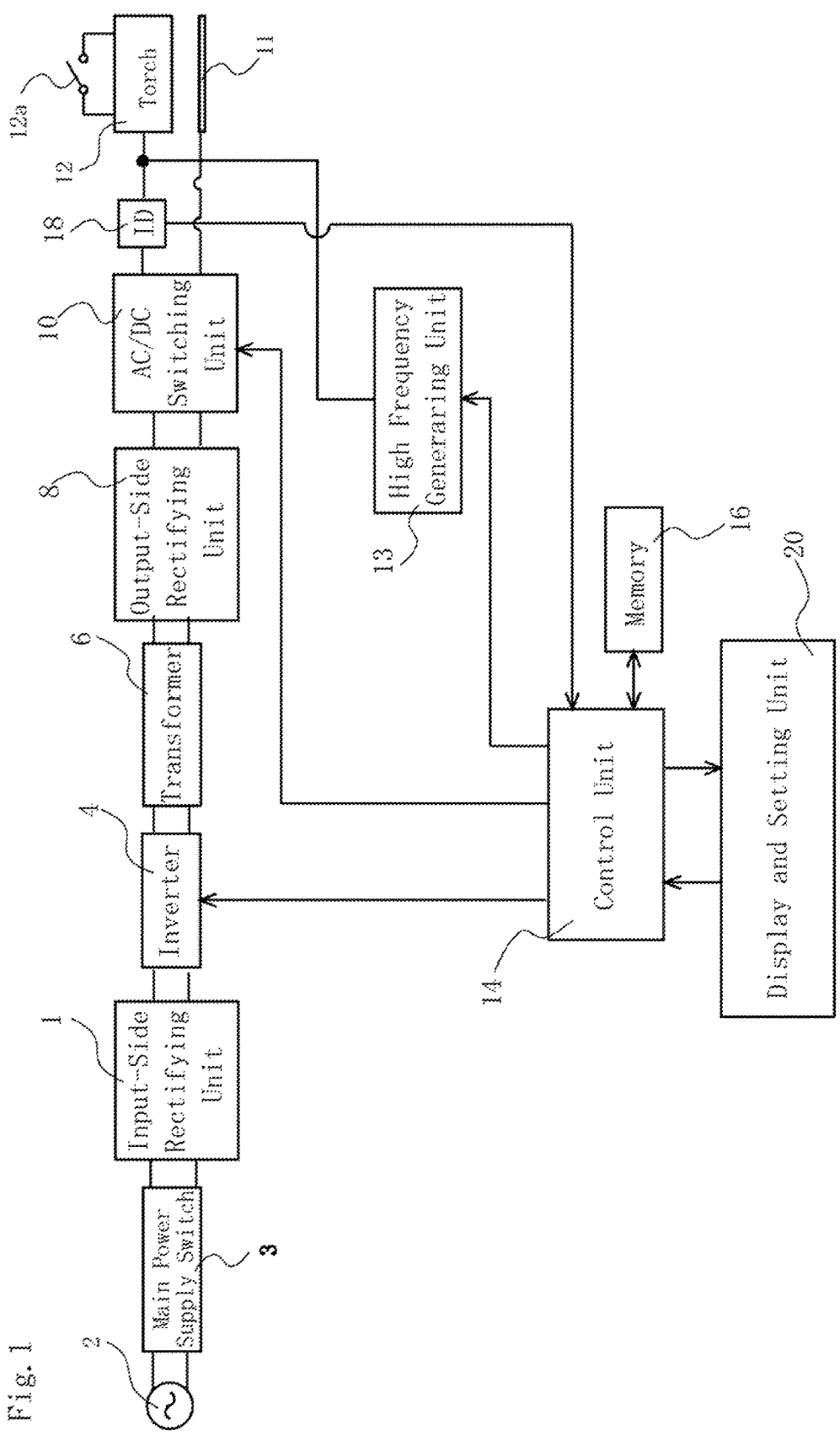
FIG. 1 is a block diagram of a power supply apparatus for use with a welding machine according to one embodiment of the present invention.

As shown in FIG. 1, the welding machine power supply apparatus includes input-side AC-to-DC converting means, e.g. an input-side rectifying unit 1, which converts a commercial AC voltage supplied thereto through a main power supply switch 3 from a commercial AC power source 2 to a DC voltage. The thus obtained DC voltage is converted in DC-to-high-frequency converting means, e.g. an inverter 4, to a high-frequency voltage having a desired frequency and a desired value. The high-frequency voltage is then applied to isolation means, e.g. a primary side of a transformer 6, where it is converted to a high-frequency voltage. The high-frequency voltage is developed in a secondary side of the transformer 6. This high-frequency voltage is then converted to a DC voltage by output side converting means, e.g. an output-side rectifying unit 8. A constant voltage device or a power factor improving device may be disposed between the input-side rectifying unit 1 and the inverter 4.

The DC voltage from the output-side rectifying unit 8 is applied to an AC/DC switching unit 10. The AC/DC switching unit 10 has an AC mode and a DC mode and can be operated in the selected mode. In the AC mode, the AC/DC switching unit 10 converts the output voltage from the output-side rectifying unit 8 to an AC voltage which is lower than the high-frequency output voltage of the inverter 4 and has a desired frequency, and applies the resulting AC voltage to a welding load. In the DC mode, the AC/DC switching unit 10 applies the DC voltage from the output-side rectifying unit 8 to the welding load. The welding load includes a workpiece 11 and a torch 12, for example. High frequency generating means, e.g. a high frequency generating unit 13, for generating an arc in a high-frequency TIG welding is disposed between the AC/DC switching unit 10 and the welding load.

Control means, e.g. a control unit 14, is provided to control the inverter 4, the AC/DC switching unit 10 and the high frequency generating unit 13. The control unit 14 includes a CPU, for example, and cooperates with memory means, e.g. a memory 16. The memory 16 has a control program stored therein. For controlling the inverter 4, the AC/DC switching unit 10 and the high frequency generating unit 13, detecting means are provided for the respective units. In FIG. 1, current detecting means, e.g. a current detector (ID) 18 is shown as an example of such detecting means. The current detector 18 detects current supplied to the welding load. Operating means for setting the aforementioned respective welding conditions, e.g. a display and setting unit 20, is provided for the control unit 14. The welding conditions set through the display and setting unit 20 are stored in the memory 16.

Figure 2:
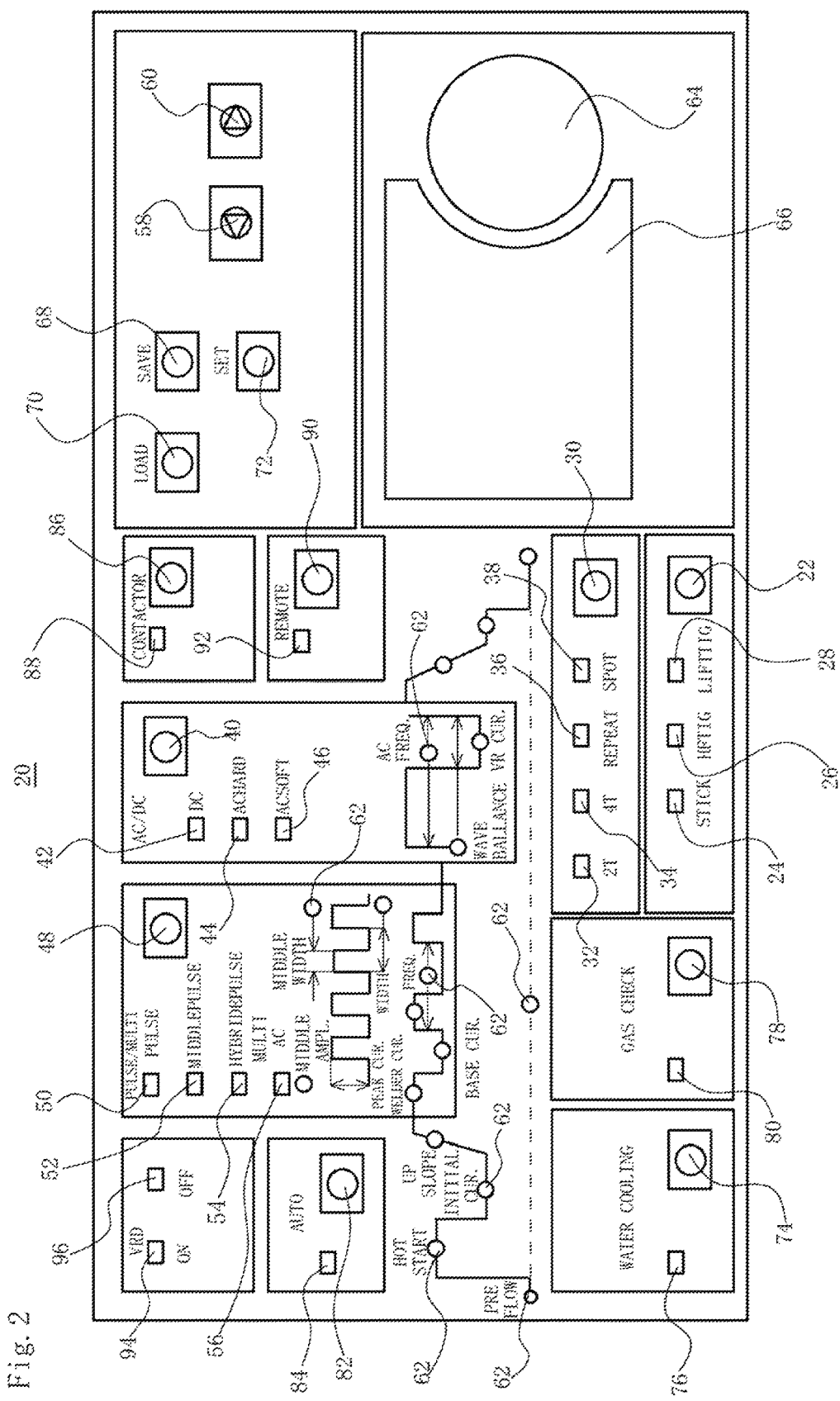
FIG. 2 is a front view of a display and setting unit for the welding machine power supply apparatus of FIG. 1.

FIG. 2 shows the details of the display and setting unit 20. The display and setting unit 20 includes a welding process switching button 22. Each time the welding process switching button 22 is pushed, the welding process is switched from stick welding process (STICK) through high-frequency TIG welding process (HFTIG) to lift TIG welding process (LIFTTIG) and, then, back to stick welding process, in order. One of a stick indication lamp 24, a high-frequency TIG indication lamp 26 and a lift TIG indication lamp 28 is turned on when the corresponding welding process is selected.

Also, a crater mode switching button 30 is provided on the display and setting unit 20. Each time the button 30 is pushed, the crater mode changes from a 2T mode (2T) through a 4T mode (4T) and a repeat mode (REPEAT) to a spot mode (SPOT) and returns to the 2T mode, in order. Depending on the crater mode selected, one of a 2T indication lamp 32, a 4T indication lamp 34, a repeat indication lamp 36 and a spot indication lamp 38 is turned on.

Furthermore, a polarity switching button 40 is provided on the display and setting unit 20. Each time the button 40 is pushed, the polarity of the current supplied from this welding machine power supply apparatus changes from AC (ACHARD) through AC (ACSOFT) to DC (DC), and then returns to AC (ACHARD) in order, and one of a DC indication lamp 42, an ACHARD indication lamp 44 and an ACSOFT indication lamp 46 is turned on.

The display and setting unit 20 is also provided with a pulse setting switching button 48 for switching a waveform mode. Each time the pulse setting switching button 48 is pushed, a pulse to be superposed on the output current when the polarity of the output current is DC, for example, is changed from a pulse (PULSE) through a middle pulse (MIDDLEPULSE) and a hybrid pulse (HYBRIDPULSE) to a multi AC (MULTIAC), and returns to the pulse (PULSE), in order, and one of a pulse indication lamp 50, a middle pulse indication lamp 52, a hybrid pulse indication lamp 54 and a multi AC indication lamp 56 for the selected one of the pulses is turned on.

In the polarity switching operation and the pulse setting operation, various welding parameters are set. This setting is done by using parameter switching buttons 58 and 60 to make the respective welding parameters settable. What parameters are settable can be known by seeing respective parameter indication lamps 62, 62, . . . , and the parameters are set through setting means, e.g. a rotary encoder 64. The set values are indicated on parameter indication means, e.g. a parameter display section 66.

For saving the welding process, the crater mode and various parameters set in the described manner, a save (SAVE) button 68 on the display and setting unit 20 is operated. This causes the control unit 14 to store the set welding conditions in a non-volatile memory which the memory 16 has. For the stored welding conditions to be read out from the memory 16, a load (LOAD) button 70 on the display and setting unit 20 is used. A set (SET) button 72 is also on the display and setting unit 20. After the save button 68 or the load button 70 is operated, the set button 72 is operated to confirm that selected one of the save or load operation should be performed. The set button 72 is also used to confirm the values set through the rotary encoder 64 when the rotary encoder 64 is operated to set welding parameters.

In addition, there are provided on the display and setting unit 20, a switching button 74 operable to indicate which type of the torch 12, a water-cooled torch or an air-cooled torch, is used, an indication lamp 76 associated with the button 74, a gas-check button 78 for on-off switching a gas valve, an indication lamp associated with the button 78, an auto (AUTO) mode switching button 82 for automatically setting appropriate parameters corresponding to the setting of the welding current, an indication lamp 84 associated with the button 82, a contactor (CONTACTOR) button 86 for turning on and off the welding machine operated from this power supply apparatus, an indication lamp 88 associated with the button 86, a remote (REMOTE) mode switching button 90 which, when operated, enables remote control through a remote controller, an indication lamp 92 associated with the button 90, and buttons 94 and 96 for indicating the state of a voltage-reduction device (VRD) used in the stick process. When the contactor button 86 is pushed, the main power supply switch 3 of the power supply apparatus is turned on or off.

Let it be assumed that a welding operator working a welding machine with the welding machine power supply apparatus with given welding conditions set therein interrupts the welding operation and moves away from the welding site, or, in other words, the operator temporarily stops the welding while the main power supply switch 3 kept on and leaves away from the working site where the power supply apparatus is installed. In such case, it may happen that other operator wants to know the operating state of the welding machine power supply apparatus, which is operating without the first operator being nearby, and operates various buttons and/or the rotary encoder on the display and setting unit 20, causing the welding conditions to be altered. When the first welding operator returns to the welding site and finds that the welding conditions have been changed, and wants to restore the welding conditions the first operator has originally set. Unless the first operator remembers the original welding conditions clearly, it is difficult to restore the original welding conditions with ease.

When the present welding machine power supply apparatus is used, a stop of development of output current from this power supply apparatus is detected on the basis of the output signal of the current detector 18. When such stop of development of the output current is detected, for example, when the current detector 18 comes not to detect the output current, or, in other words, when the welding operation has been ended while the power supply apparatus is still operating, the control unit 14 performs the later-mentioned processing shown in FIG. 3 to thereby cause the welding conditions at the time when the welding is ended to be stored in the memory 16. The current detector 18 comes not to detect current when, for example, a torch switch 12a provided on the torch 12 is turned off or when the torch 12 is moved away from the workpiece 11 to cause the generation of an arc to be stopped.

Figures 3, 4:
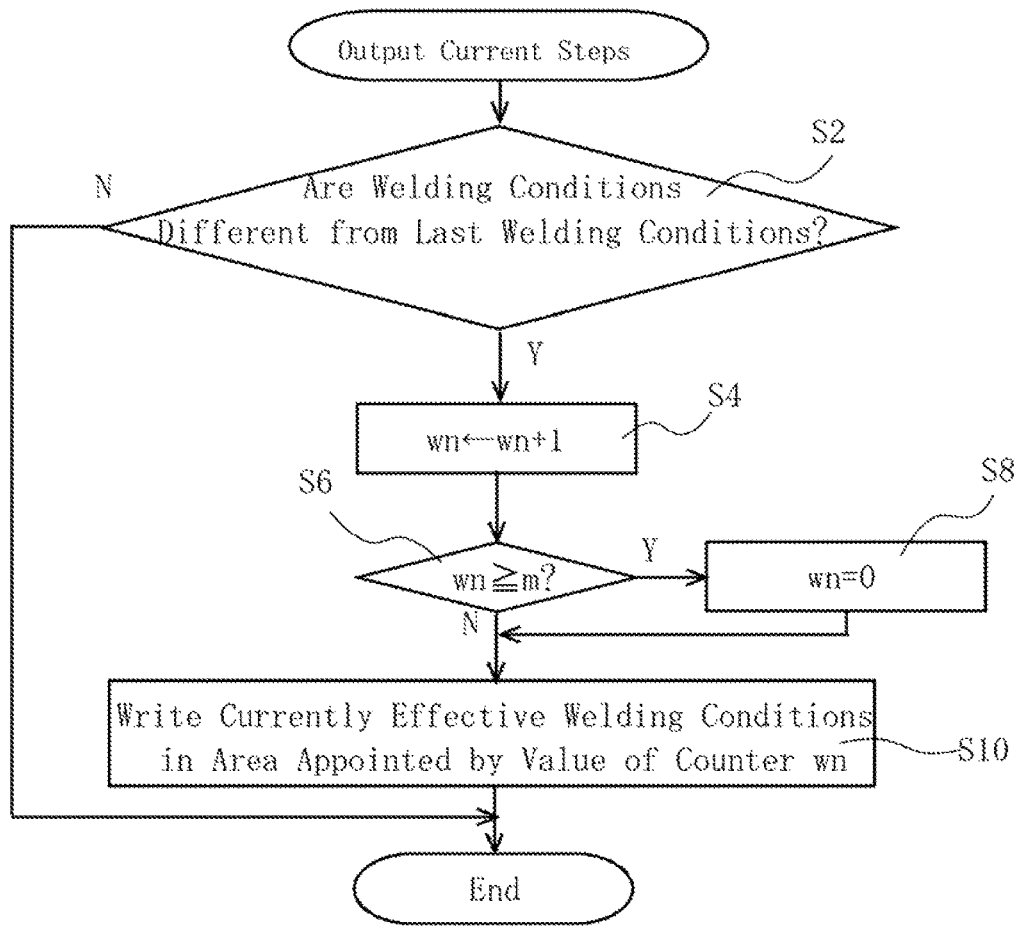
FIG. 3 is a flow chart of processing for storing welding conditions in a memory of the welding machine power supply apparatus of FIG. 1.
FIG. 4 is a schematic diagram of the memory of the welding machine power supply apparatus of FIG. 1.

As shown in FIG. 4, a plural, e.g. m, of welding condition memory areas are formed in the memory 16. Numbers 0 through m-1 are assigned to the respective ones of the m memory areas. Data is written in and read out of a memory area assigned with the area number equal to the value represented by a later-mentioned pointer. It is desirable that the memory areas be provided by a non-volatile memory.

When the welding conditions are changed, one may consider storing the welding conditions effective just before the change. On the other hand, it may happen that the welding conditions are changed while a welding operation is being carried out, but it is not necessary to store the welding conditions of that welding operation. It is considered that, when the output current is interrupted, a given welding operation has been finished, and it is desirous to store the welding conditions under which that given welding operation has been done. For that purpose, the welding conditions are stored when the current detector 18 detects no current.

When the current detector 18 comes to detect no output current, the control unit 14 executes the processing shown in FIG. 3. First, the control unit 14 makes a judgment as to if one or more of the welding conditions effective when the output current stops are different from the corresponding one or more of the welding conditions of the last welding operation (Step S2). (The welding conditions of the last welding operation are stored in the memory 16.) If the answer of this judgment is NO, the control unit 14 finishes the processing, because, when an EEPROM is used as the nonvolatile memory, duplicate storage of welding conditions already stored will waste the restricted number of times allowed for writing-in and also the memory area.

If, on the other hand, the judgment made in Step S2 is YES, the control unit 14 increases the value of a write counter wn by one (Step S4). The write counter wn is a counter provided by the control unit 14 and functions as a pointer to appoint memory areas of welding conditions in the memory 16. The control unit 14 judges as to whether the value of the counter wn is m or larger (Step S6). The value m is a value larger by one than the last one of the memory area. The value m is stored in, for example, the memory 16. If the judgment made in Step S6 is YES, the control unit 14 sets the value of the counter wn to a value 0 representing the first area in the memory area (Step S8). Subsequent to Step S8 or when the judgment made in Step S6 is NO, the control unit 14 writes the welding conditions in the area designated by the value of the counter wn (Step S10), and ends the processing. Like this, control unit 14 functions as means for writing in the memory 16.

The processing includes Steps S6 and S8. When all of the welding condition memory areas are filled with welding conditions and it becomes necessary to store new welding conditions, the new welding conditions are written in the area where the oldest welding conditions are stored, in place of the oldest welding conditions. When another set of welding conditions must be stored, they are written in the area where the second oldest welding conditions are stored, in place of the second oldest welding conditions, and so forth.

Figure 5:
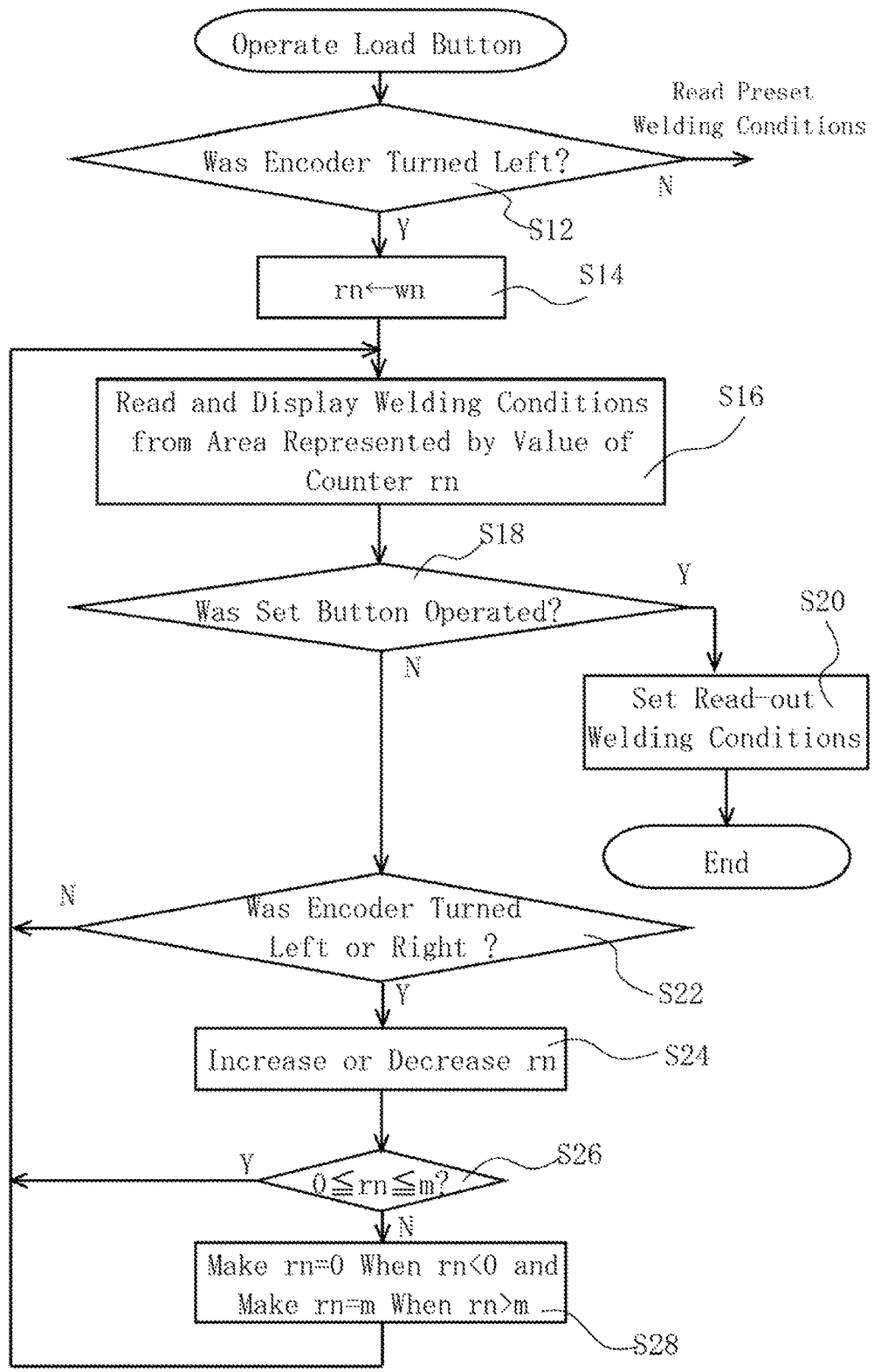
FIG. 5 is a flow chart of processing for reading welding conditions from the memory of the welding machine power supply apparatus of FIG. 1.

If an welding operator, who temporarily stopped his or her welding operation, finds that the welding conditions have been changed from the older ones under which he or she was welding, he or she operates the load button 70 functioning as part of the reading means, which causes the control unit 14 to start processing shown in FIG. 5. After that, the control unit 14, too, operates to function as part of the reading mean. The reading is carried out by operating the encoder 64 functioning as part of the reading means. The control unit 14 judges whether the encoder 64 was rotated in a first direction, e.g. left (Step S12). If the answer of the judgment is NO, or, in other words, the control unit 14 judges that the encoder 64 was rotated in a second direction, e.g. right, the control unit 14 reads welding conditions preset in the memory 16, although not shown, through operating buttons or the like, such as the save button 68 and/or the set button 72.

If the answer of the judgment made in Step S12 is YES, the control unit 14 sets the current value in the write counter wn in a read counter rn (Step S14). The read counter rn is provided by the control unit 14, too, and functions as a read-out pointer. The control unit 14 reads, out of the memory 16, welding conditions in the area represented by the value in the read counter rn, and displays the read out welding conditions (Step S16).

For example, an indication of, for example, −L1, is displayed in the parameter display section 66, which indicates that the read out welding conditions are the previous welding conditions. In order to show the read out welding conditions, appropriate ones of the indication lamps 24, 26 and 28, the crater mode indication lamps 32, 34, 36 and 38, the polarity mode indication lamps 42, 44 and 46, and various parameter indication lamps 62, 62, . . . , are turned on in accordance with the read out welding conditions.

Next, the control unit 14 judges whether or not the set button 72 functioning as part of the read means has been pushed (Step S18). If the answer of this judgment is YES, it can be considered that the welding operator has judged that the currently read-out welding conditions are the previously read-out welding conditions, and, the control unit 14 sets the read out welding conditions in the welding machine power supply apparatus (Step S20). Then, the processing is ended.

The answer of the judgment made in Step S18 may be NO. In such case, it may be considered that the welding operator wants to return the welding conditions not to the welding conditions he or she used in his or her previous welding but to the welding conditions under which he or she carried out his or her welding operation preceding the previous welding operation. Then, the control unit 14 judges whether the encoder 64 has been rotated left or right (Step S22). If the answer of the judgment is NO, the processing is returned to Step S16. If, on the other hand, the answer of the judgment is YES, the control unit 14 increases the value of the read counter rn when the encoder has been rotated left, and decreases the value of the counter rn when the encoder has been rotated right (Step S24). The rightward rotation of the encoder is taken into consideration, because the welding operator who once read out the last welding conditions stored before other welding operator stored welding conditions may change his or her mind and want to read out the welding conditions stored before the said last welding conditions. Next, the control unit 14 judges whether or not the increased or decreased value of the read counter rn is equal to 0 (zero) or more but equal to m or smaller (Step S26). If the answer of this judgment is YES, the processing returns to Step S16. In case that the answer of the judgment is NO, and if the value of the read counter rn is smaller than 0 (zero), the control unit 14 sets the value of the read counter rn to 0, while, if the value of the read counter rn is larger than m, the control unit 14 sets the value of the read counter rn to m (Step S28). Then, the processing returns to Step S16.

If Step S16 is executed when the judgment in Step S26 is YES or after Step S28 is executed, the welding conditions in the area appointed by the value of the read counter rn are read out from the memory 16 and displayed. If the read-out welding conditions are the welding conditions stored before the last ones the current worker stored, a display of −L2, for example, is displayed in the parameter display section 66. If the read-out welding conditions are the welding conditions stored by the current welding operator two storages before the last, a display of −L3 is displayed. While a display of −L2 is displayed in the parameter display section 66 as the result of reading out of the welding conditions stored before the last the current worker stored, if the rotary encoder 64 is operated to thereby read out the last welding conditions the current welding operator stored, the display in the parameter display section 66 changes to −L1. Like this, the different welding conditions stored up to m storages ago are read out, the welding operator can set his or her desired welding conditions by pushing the set button 72 when the desired welding conditions are displayed. If the load button 70 is operated at a time between succeeding steps, the control unit 14 causes the control processing of FIG. 5 to be stopped and starts to read, out of the memory 16, the welding conditions from the ones set when the load button 70 was operated last time.

In the embodiment described above, not only the welding conditions effective at the end of the immediately preceding welding operation but also the welding conditions effective at the ends of the welding operations preceding the immediately preceding welding operation are stored. However, it may be arranged that only the welding conditions effective at the end of the immediately preceding welding operation is stored. If such arrangement is adopted, with respect to the storage of welding conditions, when the answer of the judgment made in Step S2 of the processing shown in FIG. 3 is YES, the currently effective welding conditions are immediately stored in a particular welding operation storage area in the memory 16, and, with respect to the reading processing, when the answer of the judgment made in Step S12 in the processing shown in FIG. 5 is YES, the welding conditions stored in the particular welding condition storage area in the memory 16 is immediately read out.

The above-described embodiment is arranged such that welding conditions are stored when the current detector 18 comes not to detect the output current. In place of such arrangement, a torch-off detector developing an output when detecting turning off of the torch switch 12a may be used. In such an arrangement, welding conditions are stored in response to the output of the torch-off detector.

The invention claimed is:

1. A welding machine power supply apparatus having a main power supply switch and being operative, when said main power supply switch is turned on, to provide a welding output in accordance with a welding condition set therein, said welding machine power supply apparatus comprising:
operating means for setting, when operated, the welding condition in said power supply apparatus;
current detecting means for detecting output current from said welding machine power supply apparatus;
memory means in which the currently employed welding condition is automatically stored when said current detecting means detects no output current from said power supply apparatus while said main power supply switch is on; and reading means operated, when the currently employed welding condition is different from the past welding condition, to read out the welding condition stored in said memory means and setting said read out welding condition in said welding machine power supply apparatus.

2. The welding machine power supply apparatus according to claim 1, wherein said memory means has a plurality of memory areas each for storing therein a welding condition and stores the currently employed welding condition each time said current detecting means becomes to detect no output current from said power supply apparatus while said main power supply switch is on; and said reading means, when operated, reads out a desired one of the welding conditions and sets the read-out welding condition in said welding machine power supply apparatus.

3. The welding machine power supply apparatus according to claim 1, wherein the storage of the welding condition in said memory means is done when the welding condition effective when said current detecting means becomes to detect no output current from said power supply apparatus while said main power supply switch is on is different from the welding condition employed when said current detecting means previously became to detect no output current from said power supply apparatus while said main power supply switch was on.

4. A welding machine power supply apparatus having a main power supply switch and a torch switch, said welding machine power supply apparatus being operative when said main power supply switch is on and providing a welding output in accordance with a welding condition set therein, said welding machine power supply apparatus comprising:

operating means for setting, when operated, the welding condition in said power supply apparatus;

memory means in which the currently employed welding condition is automatically stored when said torch switch is turned off while said main power supply switch is on; and reading means operated, when the currently employed welding condition is different from the past welding condition, to read out the welding condition stored in said memory means and setting said read-out welding condition in said welding machine power supply apparatus.

5. The welding machine power supply apparatus according to claim 4, wherein said memory means has a plurality of memory areas each for storing therein a welding condition and stores the currently employed welding condition each time said torch switch is turned off while said main power supply switch is on; and said reading means, when operated, reads out a desired one of the welding conditions and sets the read-out welding condition in said welding machine power supply apparatus.

6. The welding machine power supply apparatus according to claim 4, wherein the storage of the welding condition in said memory means is done when the welding condition effective when said torch switch is off while said main power supply switch is on is different from the welding condition employed when said torch switch was previously off while said main power supply switch was on.

7. A welding machine power supply apparatus having a main power supply switch and being operative, when said main power supply switch is turned on, to provide a welding output in accordance with a welding condition set therein, said welding machine power supply apparatus comprising:

operating means for setting, when operated, the welding condition in said power supply apparatus;

memory means in which the currently employed welding condition is automatically stored when said welding output of said welding machine power supply apparatus temporarily stops while said main power supply switch is on; and reading means operated, when the currently employed welding condition is different from the past welding condition, to read out the welding condition stored in said memory means and setting said read out welding condition in said welding machine power supply apparatus.

* * * * *